United States Patent
Gadini et al.

(10) Patent No.: US 6,916,086 B2
(45) Date of Patent: Jul. 12, 2005

(54) ELECTRO-THERMAL ACTUATION DEVICE

(75) Inventors: Costanzo Gadini, Frasssineto Po (IT); Renato Gaj, Casale Monferrato (IT); Marco Moro, Conzano (IT)

(73) Assignee: Eltek S.p.A. (IT)

( * ) Notice: Subject to any disclaimer, the term of this patent is extended or adjusted under 35 U.S.C. 154(b) by 131 days.

(21) Appl. No.: 10/635,469

(22) Filed: Aug. 7, 2003

(65) Prior Publication Data

US 2005/0029901 A1 Feb. 10, 2005

(30) Foreign Application Priority Data

Aug. 7, 2003 (IT) ...................................... TO2002A0709

(51) Int. Cl.⁷ ................................................ B41J 2/05
(52) U.S. Cl. ...................................................... 347/56
(58) Field of Search .............................. 347/56, 84, 85, 347/86, 87, 20, 40, 47, 50, 57, 54, 5; 92/88, 89, 1; 251/11, 335.1, 335.2, 335.3

(56) References Cited

U.S. PATENT DOCUMENTS

2003/0188768 A1 * 10/2003 Cerruti et al. ............ 134/57 D

* cited by examiner

*Primary Examiner*—Raquel Yvette Gordon
(74) *Attorney, Agent, or Firm*—Sughrue Mion, PLLC

(57) ABSTRACT

An electro-thermal actuator device (1) comprises a casing defining a cavity (Z1, Z2) in which there are arranged a thermal actuator (6), an electric heater (10), at least a part of an actuating shaft (3) and at least a part of two electric terminals (11, 12) for supplying the heater (10). The casing is formed by two half-shells (2A, 2B) mutually coupled along two facing surfaces of junction (S), each surface pertaining to a respective half-shell. Sealing means (15, G) are provided, which are operatively arranged between the two surfaces of junction (S) and cooperating with a respective half-shell (2A, 2B) for hermetically insulating at least a part of the inner cavity (Z1, Z2) from the external environment.

72 Claims, 13 Drawing Sheets

Fig. 1
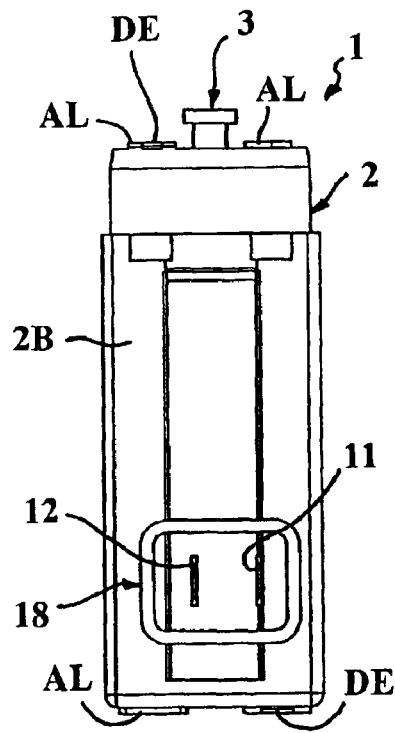
Fig. 2
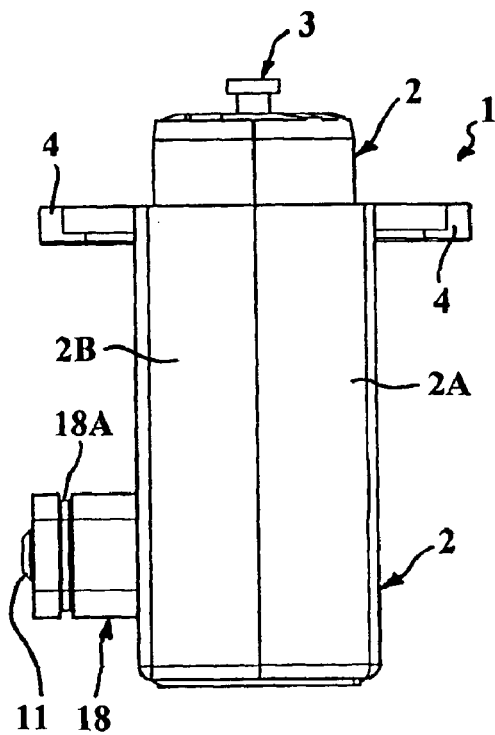
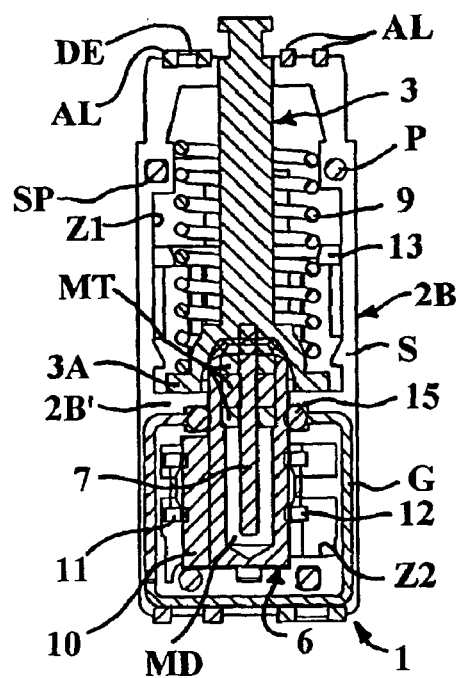
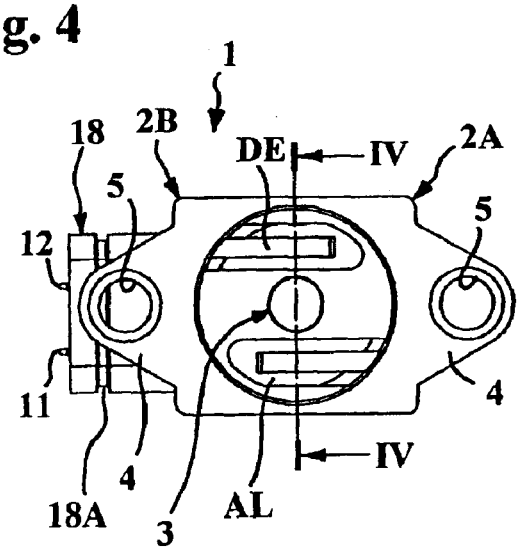
Fig. 3

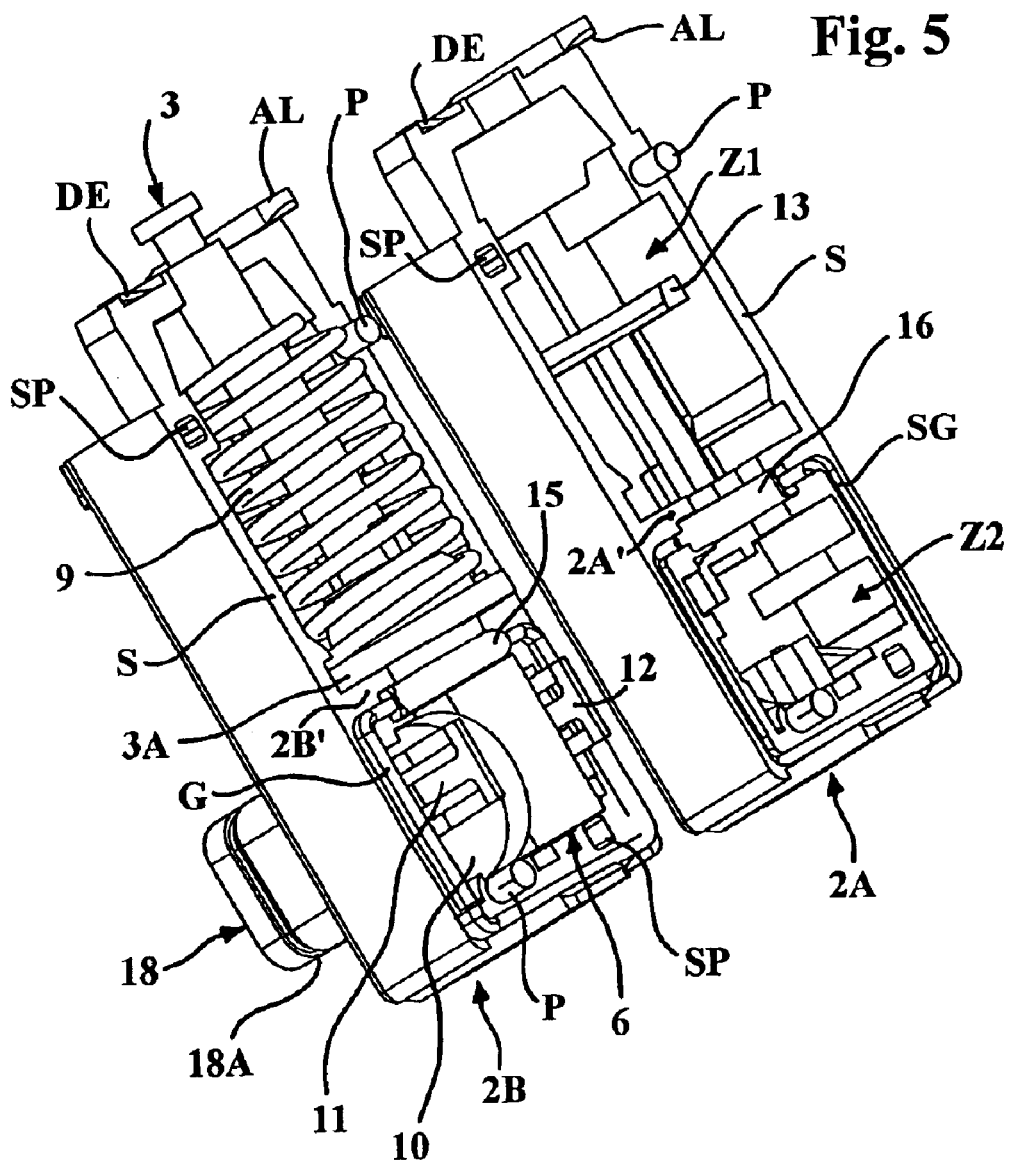

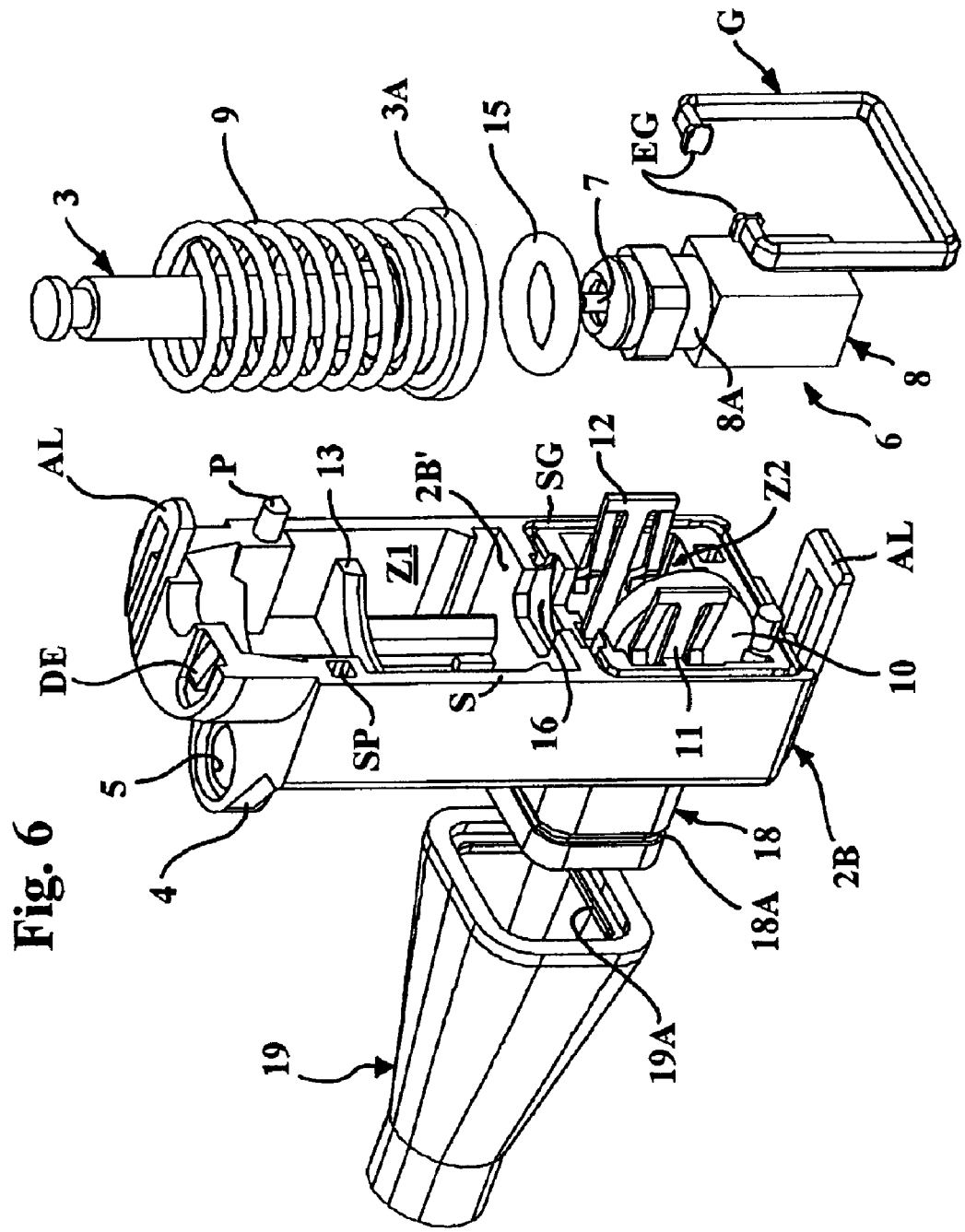

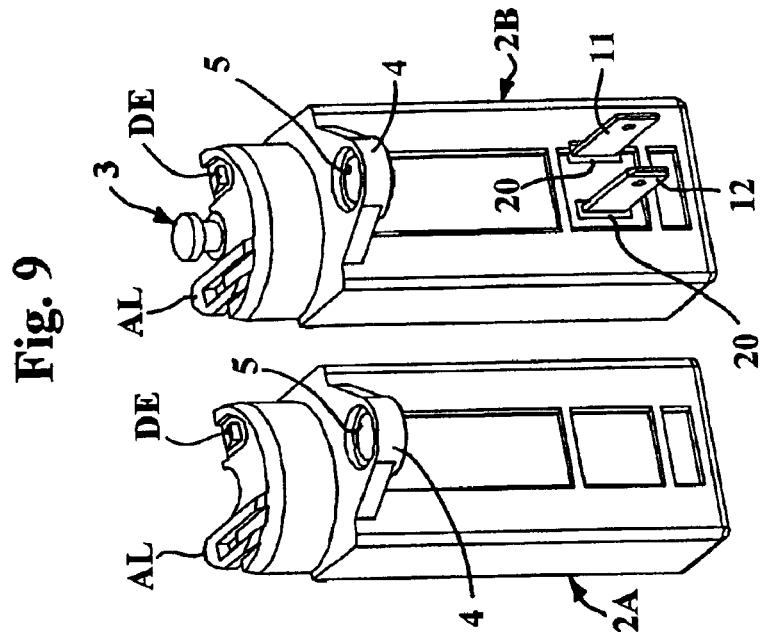
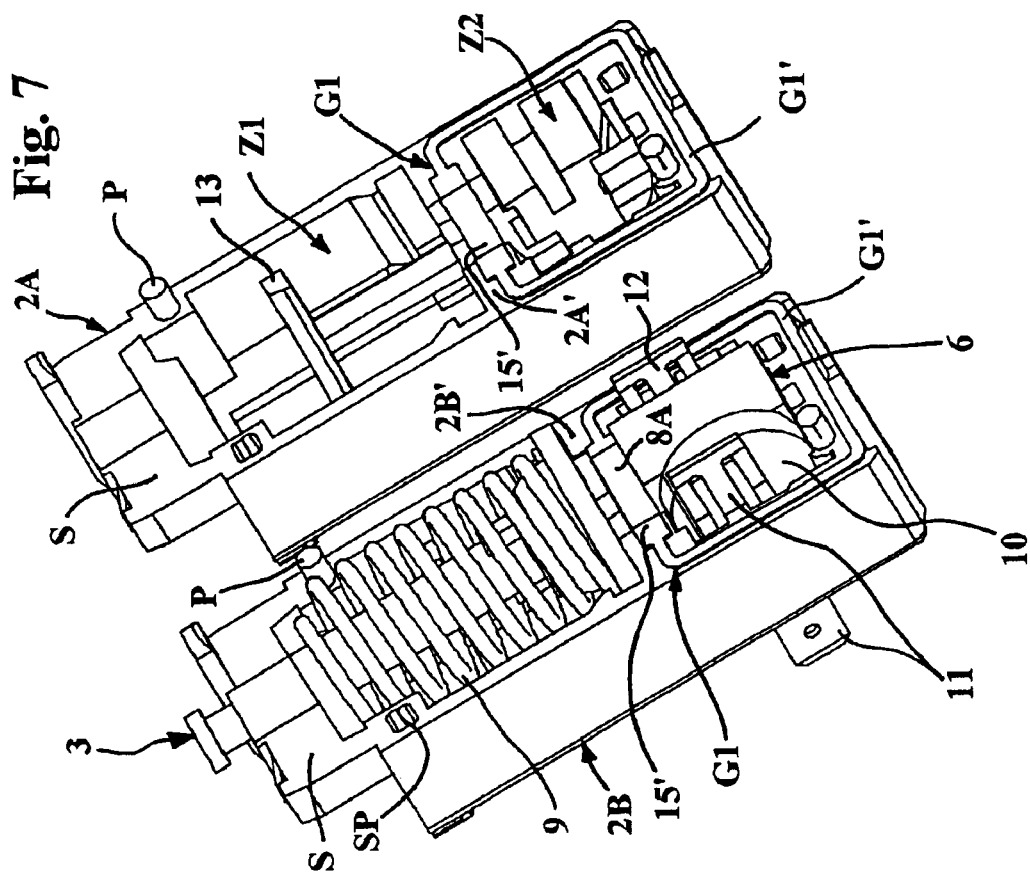

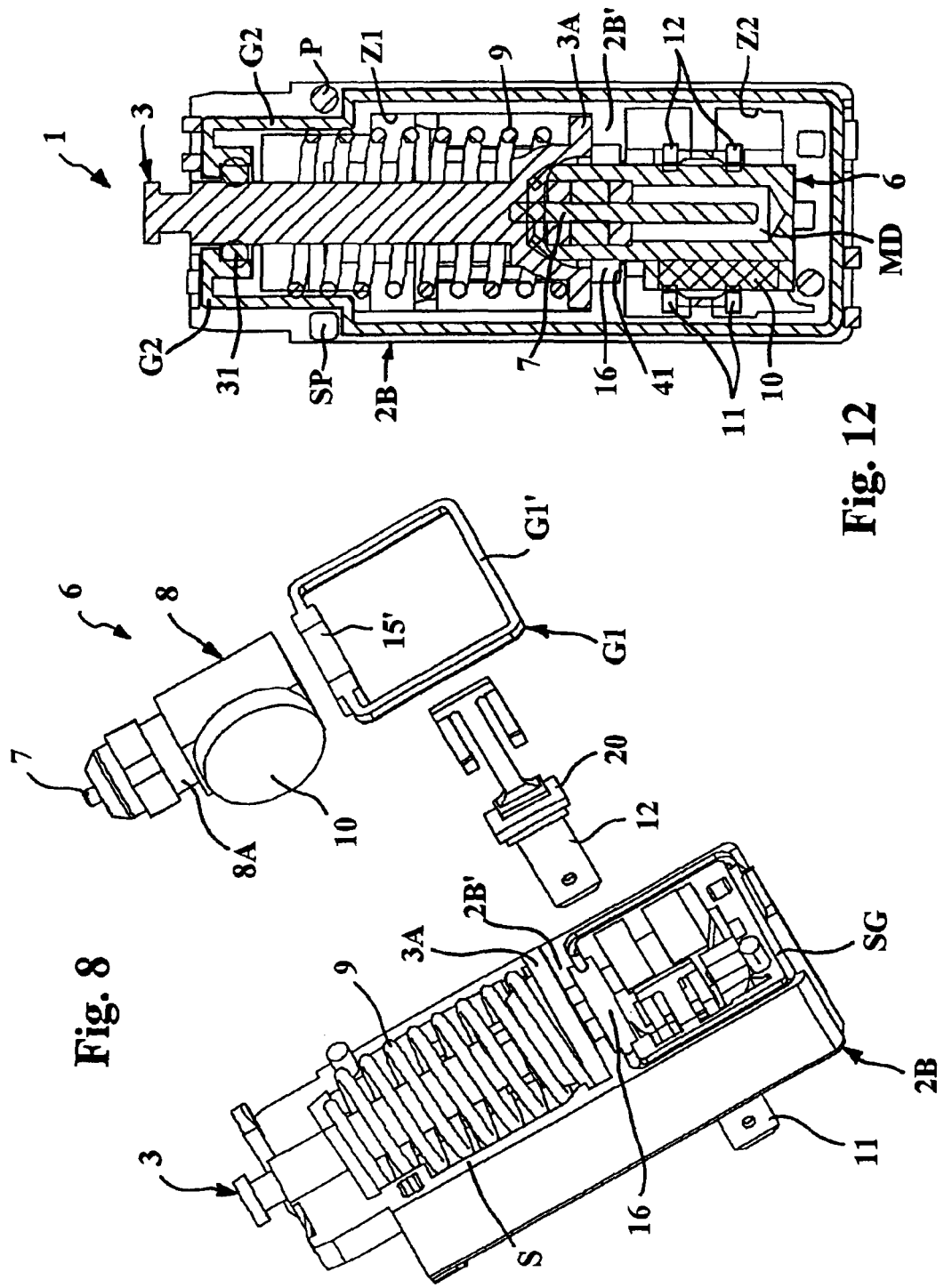

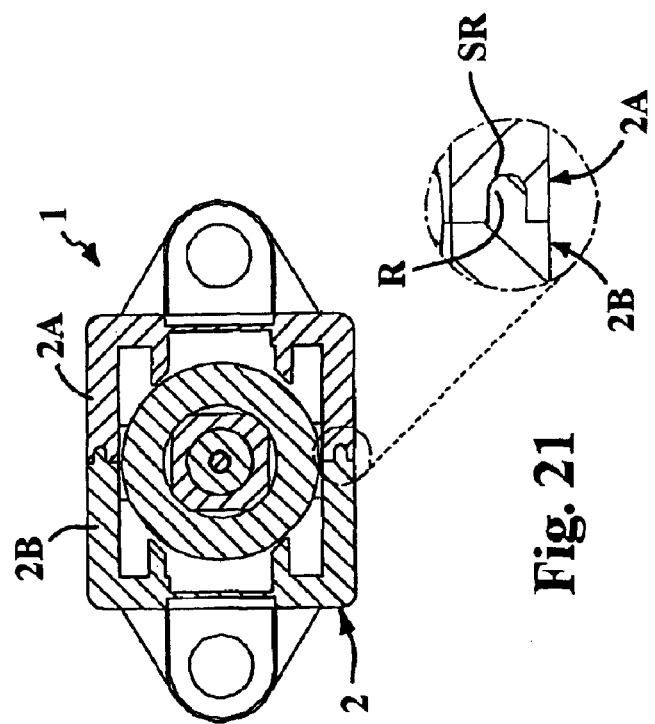
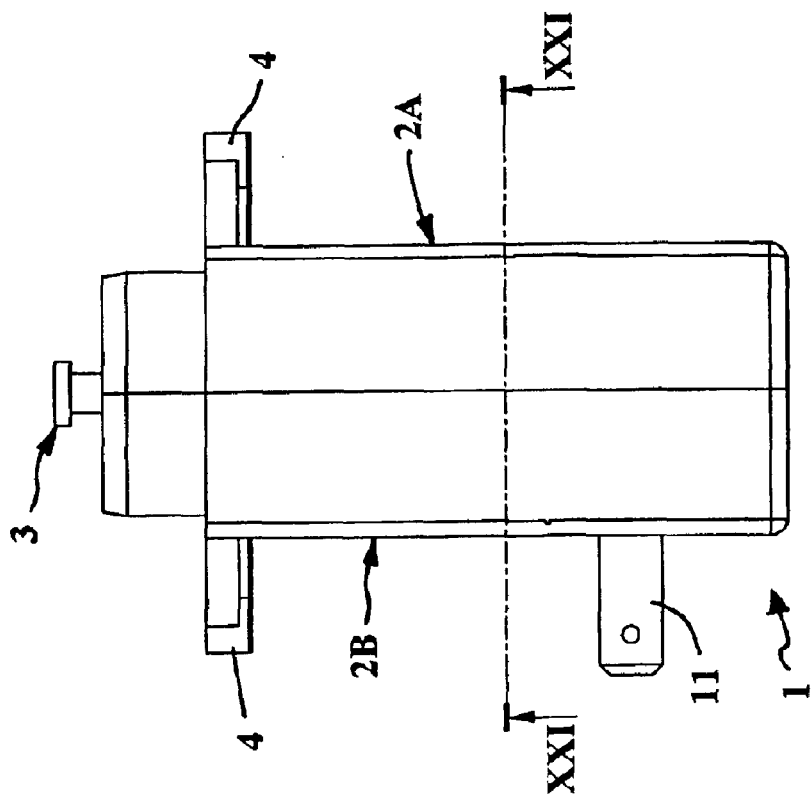
Fig. 20
Fig. 21

ELECTRO-THERMAL ACTUATION DEVICE

BACKGROUND OF THE INVENTION

The present invention refers to an electro-thermal actuator device.

Devices of the indicated type, also known as thermal actuators, usually comprise a casing, for instance made of thermoplastic material, within which there are contained a thermal head and, at least partly, an actuating shaft.

The head comprises a body made of an electrically and thermally conductive material (such as steel), containing a thermally expansible material (such as a wax) within which a piston is at least partially dipped; said body is in contact with an electric heater, typically a PTC resistor, electrically supplied through two terminals.

In some instances, thermal actuators of the above type suffer malfunctions, due to the attack operated by external agents being present in the air.

From document WO9832141 a thermal actuator of the indicated type is known, whose casing is filled with material apt to insulate from the environment components being subjected to electric voltage.

Said material is capable of reticulating so as to form an elastic and compressible foam, i.e. having a reduced mechanical strength to tearing. In this way, following the first operating cycle of the thermal actuator, the portion of the insulating material coating the movable components of the thermal actuator can tear, whereas the remaining portion of the insulating material within the casing remains unbroken, so as to coat the fixed electric components, and protect them from the potentially harmful agents being present in the ambient air.

SUMMARY OF THE INVENTION

The present invention has the general aim of realizing new techniques for obtaining the insulation of the internal components of a thermal actuator, and namely of its electrical parts, with respect to the external environment.

This and other aims, which will be apparent in the following, are attained according to the invention by an electro-thermal actuator device having the features of the annexed claims, which are to be meant as an integral part of the present description.

BRIEF DESCRIPTION OF THE DRAWINGS

Further aims, features and advantages of the present invention will emerge from the detailed description which follows and from the annexed drawing, which are supplied as a pure not limiting example, wherein:

FIG. 1 is a first elevation view of a thermal actuator manufactured in accordance with a first embodiment of the invention;

FIG. 2 is a second view of the thermal actuator of FIG. 1;

FIG. 3 is a top view of the thermal actuator of FIG. 1;

FIG. 4 is a section according to line IV—IV of FIG. 3;

FIG. 5 is a perspective view of the thermal actuator of FIG. 1, with the respective casing being open;

FIG. 6 is an exploded view of some components of the thermal actuator of FIG. 1;

FIG. 7 is a perspective view of a thermal actuator manufactured in accordance with a second embodiment of the invention, with the respective casing being open;

FIG. 8 is an exploded view of some components of the thermal actuator of FIG. 7;

FIG. 9 is a perspective view of two parts constituting the casing of the thermal actuator of FIG. 7;

FIG. 12 is a section, being similar to the one of FIG. 4, of the thermal actuator of FIG. 10;

FIG. 20 is an elevation view of a thermal actuator manufactured in accordance with a fifth embodiment of the invention;

FIG. 21 is a section according to line XXI—XXI of FIG. 20;

DETAILED DESCRIPTION OF THE DRAWING

Figure 10:
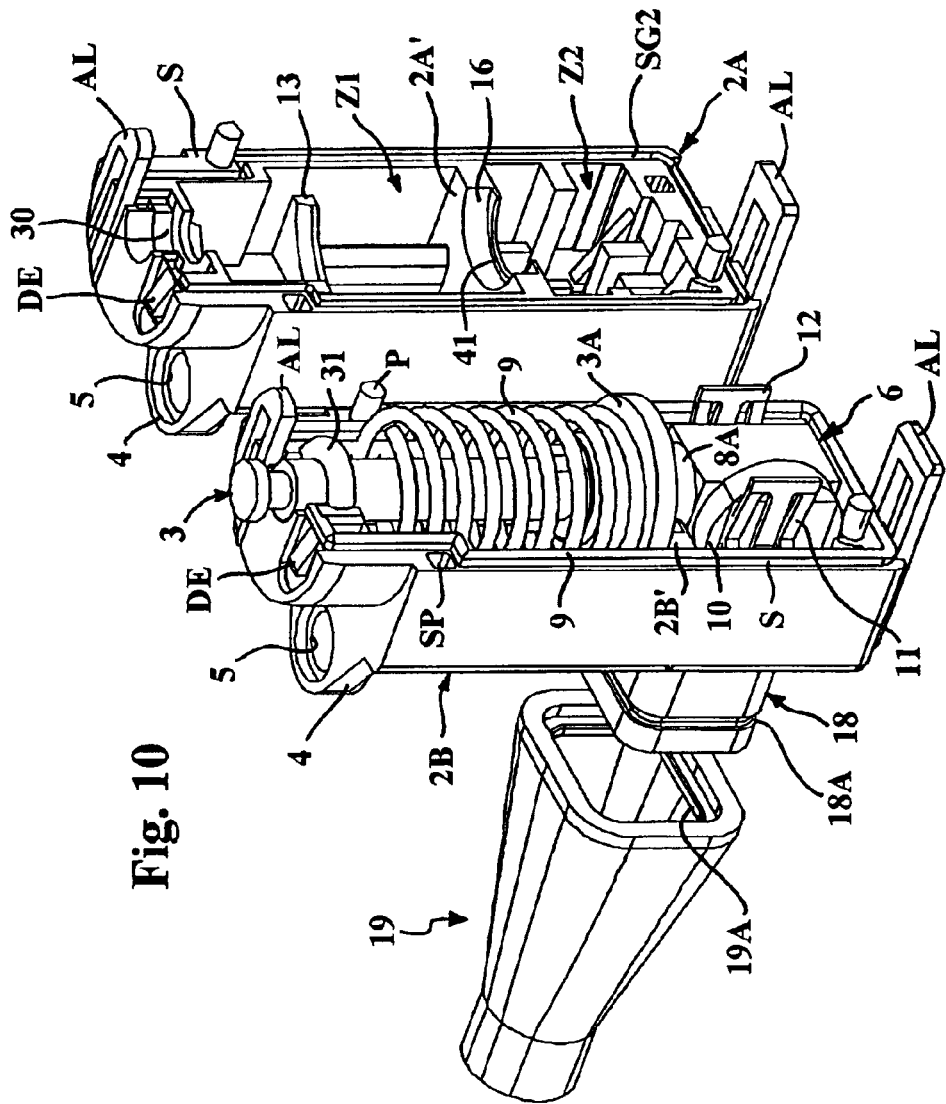
FIG. 10 is a perspective view of a thermal actuator manufactured in accordance with a third embodiment of the invention, with the respective casing being open.

FIG. 1 to 6 represent a first embodiment of an electro-thermal actuator device or thermal actuator manufactured in accordance with the invention.

The thermal actuator device, indicated with 1 as a whole, comprises an external casing 2 formed by two half-shells 2A and 2B made of thermoplastic material. Each half-shell 2A, 2B has coupling means designed for co-operating with analogous coupling means of the other half-shell; in particular, in the exemplified case, such means of mutual coupling are represented by elastic wings AL, each of them being designed to cooperate with a respective coupling tooth DE; the shape of such wings AL and teeth DE is visible in particular in FIG. 6. On the surfaces of the half-shells 2A, 2B destined to mate, indicated with S, there are also defined protruding pins P and cavities SP, whose functions will be made clear in the following.

At a longitudinal end of the casing 2 an aperture is defined, from which a portion of an actuating shaft 3 comes out. Each half-shell 2A, 2B defines a respective bracket 4, having holes 5, through which the casing 2 can be fixed by screws or other known fixing means to a stationary part of the apparatus onto which the thermal actuator 1 is assembled and/or used.

Within the body 2 a thermic actuator is housed, hereinafter referred to also as thermal head, indicated with 6 as a whole, comprising at least a respective thrust element or piston 7; an end of piston 7 is confined within the body of the thermal head, indicated with 8, while its other end comes out of the same, through suitable sealing means (indicates with MT in FIG. 4), so as to operate a thrust of the shaft 3; preferably, piston 7 is at least partly dipped into and in contact with a wax MD or other thermally expansible material which is within body 8.

Body 8 of the head 6 is maintained, in a known way, in a proper position within the casing 2, within which also the shaft 3 is also at least partially arranged. The latter is movable under the action of piston 7, against the force of a spring 9 arranged within the casing 2, between the upper part of the latter and a widening 3A of the shaft 3; as it can be seen in FIG. 4, in correspondence of the widening 3A, the end of the shaft 3 has a concavity within which there is positioned the end of the body 8 from which piston 7 comes out; the other end of the shaft 3 comes out from the cited upper aperture of the casing 2.

Reference 10 designates a heating element for the thermal head 6, such as a positive temperature coefficient or PTC thermistor, whereas 11 and 12 designates two electric supply terminals. Terminals 11 and 12 have each a respective inner portion, which is housed within the casing 2; such inner portions of terminals 11 and 12 have respective elastic leaves for electric contact with the heating element 10 and with the body 8 of the head 6, which is made of an electrically and thermally conductive material, such as steel; in this way an electrical continuity can be determined among terminal 12, head 6, heating element 10 and terminal 11.

Preferably, the two half-shells 2A and 2B are realized so that at least a part of the respective surfaces S can reciprocally couple in correspondence of a plane which axially crosses the thermal head 6 and/or the actuating shaft 3.

The type and the operation of the device 1 are known per se; in short, by electrically supplying the terminals 11 and 12, the heating element 10 generates heat, that is transferred to the body 8 of the head 6, so as to cause expansion of a suitable material, such as a wax, contained within the same body 8. Said expansion causes a linear motion of the piston 7, that in turn generates a thrust on the shaft 3; said motion continues until the widening 3A of the shaft 3 strikes a respective stop 13 being defined within the casing 2. Upon expiration of the electric supply to terminals 11 and 12, the heater 10 cools down progressively, and the same occurs for the wax, which therefore shrinks; piston 8 and shaft 3 return to the starting rest position, by virtue of the action of spring 9.

In accordance with an important aspect, in the embodiment of the invention to which FIGS. 1–6 relate, the body 8 is preferably provided with a seal circular profile, or a circular seat or a throat which is capable of receiving an elastic annular gasket, preferably a gasket of the O-ring type; the cited circular seat and the respective gasket are indicated with 8A and 15, respectively, for instance in FIG. 6. Seat 8A is located close to a part of the body 8 having a quadrangular section, or anyway close to a part of the body 8 having flat faces.

According to a further aspect, in the embodiment of FIGS. 1–6, the inner cavity of the casing 2 is subdivided into two operating zones, indicated with Z1 and Z2 in FIGS. 4–6, by means of an intermediate wall. The cited intermediate wall is formed by the union of the two half-walls 2A' and 2B', defined respectively by the half-shells 2A and 2B, as it can be seen for instance in FIG. 5.

As it can be imagined for instance from FIG. 4 or 5, zone Z1 is destined to contain the truly mechanical and movable members of the thermal actuator 1, i.e. the shaft 3 and the spring 9, as well as the front portion of the head 6; zone Z2 is instead destined to contain the truly electrical members, i.e. the heater 10, the inner portion of terminals 11, 12 and the prevailing part of body 8 of head 6.

The aforesaid half-walls 2A' and 2B' extend from the bottom of the respective half-shells 2A and 2B until the height of the respective surfaces S, or until the plane defined by the surfaces S; as it will turn out in the following, in the upper portion of the half-walls 2A' and 2B' there are present respective seats for housing a part of the thermal head 6 or a part of respective seal means 15. In each half-wall 2A', 2B', that preferably forms a part of the surface S of the respective half-shell, there is defined a semicircular seat 16, being visible for instance in FIGS. 5 and 6; in the not limiting example of said figures, the semicircular seat 16 is provided with two side shoulders, for improving the positioning and/or the sealing of the gasket 15 (however, said shoulders could be present only in part, or completely omitted).

By coupling the two half-shells 2A, 2B, and thus the half-walls 2A' and 2B', the seats 16 form a circular housing for the gasket 15 being mounted on body 8 of head 6; gasket 15 thus operates a seal, at least a radial seal between the body 8 of head 6 and said circular housing, and therefore between the body 8 and the body 2 of the device 1.

In the embodiments of FIGS. 1–6, there is provided a perimetral seal gasket, indicated with G, which operates into seats SG made along a part of surfaces S of half-shells 2A, 2B destined to mate, namely along the part pertaining to zone Z2. As it can be seen for instance in FIGS. 4 and 5, gasket G is also provided for cooperating in sealing with the annular gasket 15, mounted on body 8 of head 6; to this purpose, and as it can be seen in FIG. 6, gasket G has two ends EG shaped for mating the shaped section of gasket 15, for instance through elastic interference; in the case exemplified in FIG. 6, ends EG have for that purpose a slightly enlarged shape and/or define a concavity.

The elastic perimetral gasket G can be advantageously molded over, or molded jointly with, one of the two half-shells, for instance half-shell 2B, for surrounding the respective part of the zone Z2 lodging the electrical members, and therefore to extend at least in part also on the respective half-wall 2B', as it can be seen in FIGS. 5 and 6; for that purpose, the half-shell 2B is equipped with a suitable seat SG, where the gasket G can be over-molded or co-molded; also the other half-shell, i.e. half-shell 2A, preferably will have a respective seat, also indicated with SG, destined to receive and cooperate in sealing with the gasket G carried by the half-shell 2B. Clearly, gasket G could be obtained as an element being separate from the half-shells, for then being inserted in the respective seat SG.

According to a further important aspect of the invention, in the version exemplified in FIGS. 1–6, the half-shell 2B defines a protrusion, or a projecting tubular portion 18, from which the portions of terminals 11, 12 being external to the casing 2 come out, said portions being destined to the connection with electrical connectors or cables, not shown, for supplying the heater 10. As it can be seen, for instance from FIG. 1, the tubular portion 18 surrounds the cited external portions of terminals 11, 12, which are conveniently shaped like a "faston"; portion 18 has on the respective external surface a perimetral seat or throat, indicated with 18A in FIGS. 5 and 6. In a preferred version, the external ends of terminals 11, 12 and the tubular portion 18 can favorably be made or shaped like a standard electrical connector, such as a Rast 5 or a Rast 2-5 connector.

The tubular portion 18 has the function of cooperating with an external seal member, indicated with 19 in FIG. 6, at least partly elastic, which is suitable for being inserted onto the same portion 18. In the example, the external member 19 has a hollow shape apt to connect in a sealed way the profile of the tubular portion 18 with the profile of the electrical cable or conductor to be wired to terminals 11 and 12.

Close to the end of greater section of member 19, there is internally defined a perimetral projection 19A, destined to elastically couple with or anyway get into the seat 18A which is on the tubular portion 18, for sealing purposes. The other end of the external sealing member 19 is substantially cylindrical or anyway shaped so as to adapt in an elastic way onto at least a passing electric conductor or cable, in order to carry out a seal on the latter.

The assembly of the thermal actuator 1 of FIGS. 1–6 is very easy to perform.

Gasket G is inserted in or co-molded with seat SG of the half-shell 2B; in the part of zone Z2 defined by half-shell 2B, the terminals 11, 12, the heater 10, the head 6 and the gasket 15 are then mounted; preferably, gasket 15 is previously mounted on head 6, in correspondence of the respective seat 8A, or positioned in correspondence of seat 16 during the above mounting operations of the head 6 in the body 2 or half-shell 2B.

Should the seat 8A allow for movements of the gasket 15, during mounting of the head 6 care will be taken in order to verify that gasket 15 is positioned in correspondence with the respective seat 16 of the half-wall 2B', and in a way that the same gasket 15 is operatively coupled with the ends EG of gasket G.

After the assembly of the shaft 3 and the spring 9 within the half-shell 2B, also performed in a known way, the half-shell 2A is coupled with the half-shell 2B. Such an operation is carried out to be sure that within seat 16 of half-wall 2A' there is inserted the respective portion of gasket 15 and within SG of half-shell 2A there is inserted the respective portion of gasket G. The mutual fixing between the two half-shells 2A, 2B is obtained by hooking wings AL and teeth DE of half-shell 2B with wings AL and teeth DE half-shell 2A; the precise reciprocal positioning of the two half-shells is obtained and warranted by the coupling of pins P and cavities SP of the same half-shells.

Following formation of casing 2, as described beforehand, within the latter the two zones Z1 and Z2 will thus be formed, the zone Z2 being insulated from the external environment by the gaskets 15 and G.

It should be noticed that the front part of body 8 of head 6 will come out into zone Z1; sealing in the area in which body 8 crosses the dividing wall formed by half-walls 2A', 2B' is assured by gasket 15, which operates for sealing with seats 16 being defined in the same half-walls.

The fact that the front part of body 8 can come out into zone Z1 allows, jointly with the presence of the above mentioned concavity of portion 3A of shaft 3, to use a relatively long head 6, or to take advantage of the whole stroke of its piston 7; this results advantageous in order to have a piston 7 able to perform a relatively long stroke; in the represented example, the stroke of piston 7 is in particular of about 6 mm. Under these conditions, part 3A of shaft 3 can therefore move back to a greater extent, well beyond the profile of head 6 from which piston 7 comes out.

Insulation from the environment is completed by mounting the external sealing member 19, that is firstly inserted on the supply cable of the thermal actuator 1; after the connection of said cable to terminals 11, 12, member 19 is coupled in the above described way on the tubular portion 18, through insertion of the projection 19A of the former into the throat 18A of the latter.

In a possible variant embodiment of the thermal actuator 1, the functions of the gaskets 15 and G of FIGS. 1–6 can be integrated into two specular half-gaskets; such a variant is represented in FIGS. 7–9, in which the cited half-gaskets are indicated with G1; it should be noticed that in FIGS. 7–9 the same reference numbers of the previous figures are used, in order to indicate elements being technically equivalent to those already described.

In such an embodiment, annular gasket 15 of FIGS. 5–6 it substantially divided into two half-rings 15', each being in a single piece with a respective part G1' of the half-gaskets G1, said part G1' being substantially equal to one half of the perimetral gasket G of FIGS. 5–6; said gaskets are therefore substantially divided by a plane which coincides or is parallel to that of the coupling surfaces S of half-shells 2A, 2B.

Half-gaskets G1 are positioned in respective seats SG and 16 of half-shells 2A, 2B, so as to slightly project or come out from surfaces S, in particular to mutually squash and couple for sealing purposes during assembly. Also in this version, each half-gasket could be molded with or molded over the respective half-shell, or mounted of the latter, after its separate manufacturing.

With respect to the previous embodiment, here each half-shell 2A, 2B is associated to the respective half-gasket G1, so that the half-ring 15' is positioned in the respective seat 16 defined in the half-wall 2A', 2B', and part G1' is positioned in the respective seat SG. Head 6 is then positioned within one of the two half-shells, for example half-shell 2B, so as that the throat 8A of body 8 is located in correspondence of the half-ring 15' of half-gasket G1. Later on, by coupling the half-shells 2A, 2B in the above described ways, the half-shells mates reciprocally and with body 8 of head 6, for sealing purposes; as already said, a slight elastic interference can be provided for that purpose between the two half-gasket G1, so as to improve the sealing effect.

In FIGS. 8 and 9 there are also visible, or partially visible, elastic elements 20, having a respective slit, that are provided for carrying out a seal between the electrical terminals 11, 12 and the casing 2, or better the half-shell 2B in which the passages for said terminals are provided.

Elements 20 in elastic material can be mounted or molded over terminals 11, 12 and the terminals can then be driven into in the respective half-shell 2B. Alternatively, elements 20 could be driven into or molded over the half-shell 2B, in correspondence of the passages for the terminals 11, 12; thereafter, a respective terminal is then driven into the slit of each element 20.

In the two embodiments of FIGS. 1–6 and 7–9, respectively, the perimetral sealing performed by gaskets 15 and G or by half-gaskets G1 relates to zone Z2 only, in which the electrical members are arranged; however, it is clear that such sealing could be extended in the same way to the zone Z1, and thus to the entire inner cavity of the casing 2 of the thermal actuator 1; in such a case, the sealing carried out on the head 6 (through the ring-like gasket 15 of FIGS. 1–6 or the half-gaskets G1 of FIGS. 7–9) could advantageously be shifted to the sliding shaft 3. Such a variant embodiment is shown in FIGS. 10–12, in which the same reference numbers of the previous figures are used, for indicating elements being technically equivalent to those already described.

Figure 11:
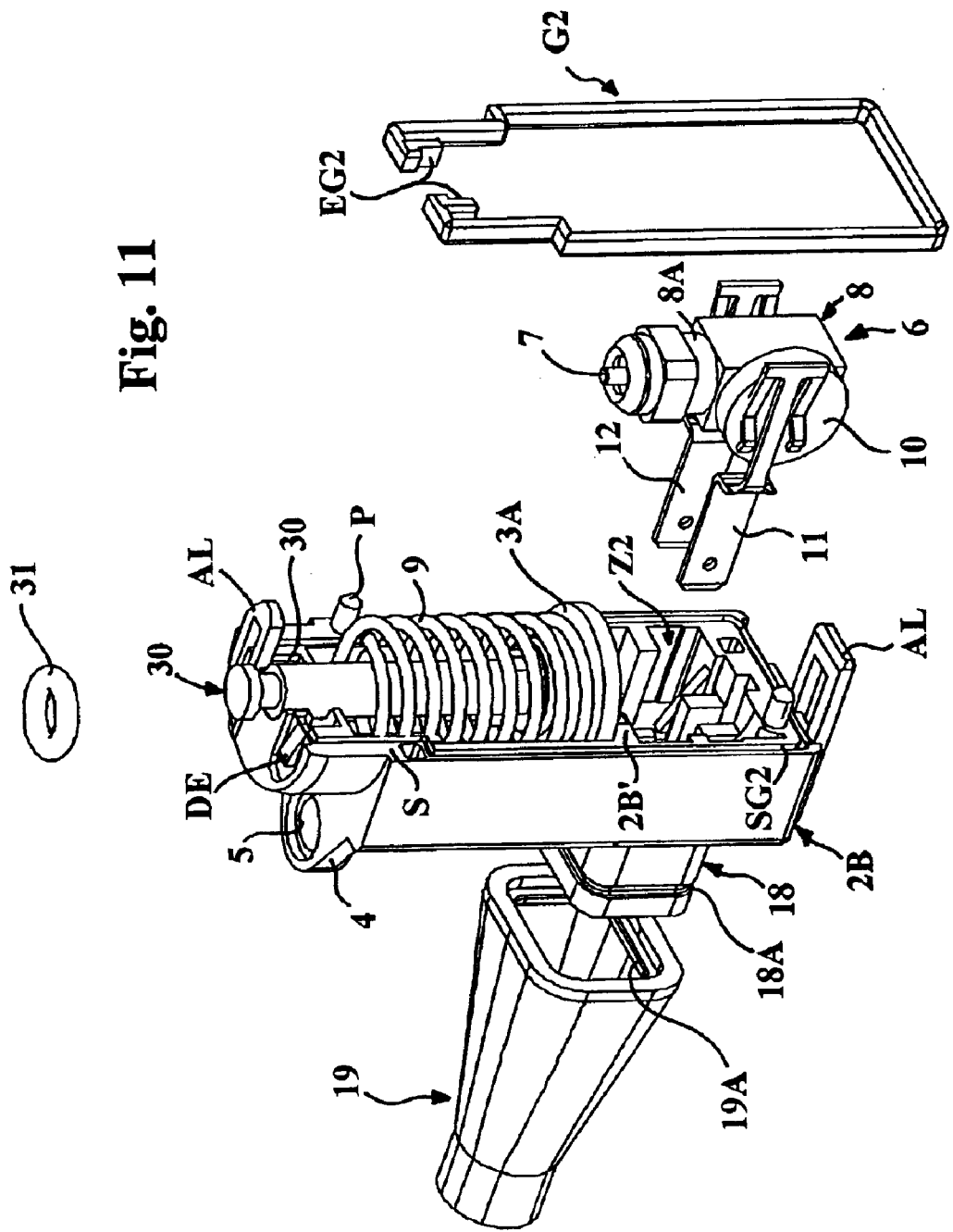
FIG. 11 is an exploded view of some components of the thermal actuator of FIG. 10.

In the case of FIGS. 10–12 the two half-shells 2A, 2B have respective semicircular seats 30 close to the upper passages that form the opening of the casing 2 through which the shaft 3 moves; the semicircular seats 30 are provided in order to house respective portions of an elastic annular gasket, for instance an o-ring gasket, indicated with 31.

In the embodiment of FIGS. 10–12, unlike the prior art, the shaft 3 does not have the typical longitudinal burrs caused by the molding operation. In other words, according to the traditional technique, shafts of the type of the one indicated with 3 are molded by means of two moulds with symmetric half-profile which open orthogonally with respect to the axis of the same shaft; this has the consequence that a longitudinal junction line is formed along the shaft obtained by molding, which line is potentially abrasive on two sides and for the whole length of the same shaft. In the case of the embodiment of FIGS. 10–12, the shaft 3 is instead realized so that its zone destined to operate in conjunction with the gasket 31 is free from said junction line; this can be obtained by molding the shaft 3 by means of two half-moulds which open in the sense of the axis of the shaft.

For the remainder, the variant embodiment of FIGS. 10–12 is conceptually similar to the embodiment of FIGS. 1–6, but in this case there is provided a perimetral gasket G2 that develops almost for the whole surface S of the half-shell 2B; also in this case, ends EG2 of the perimetral gasket G2 are suitably shaped in order to cooperate with gasket 31, like it can be seen for example in FIG. 12. The two half-shells 2A and 2B have also seats SG2 for housing gasket G2, which seats extend almost for the respective surfaces S of the half-shells 2A, 2B.

Clearly, also in this case the gasket G2 could be molded with or over one of the two half-shells, or be conceived as a separate member. Eventually, moreover, like in the embodiment of FIGS. 7–9, the sealing arrangement of the embodiment of FIGS. 10–12 could be obtained through two specular half-gasket, each being destined to be associated to a half-shell and comprising a half-ring, equaling one half of the gasket 31, and one perimetral portion, equaling one half of the gasket G2.

FIGS. 13–19 shows a further possible embodiment of the present invention, in which the sealing means for insulating from the environment the inner cavity of casing 2 of the thermal actuator 1 are formed by distributing along the coupling surface S a material which is capable of performing a sealing, namely a material capable to harden and/or reticulate after the assembly of the two half-shells 2A and 2B; such a material could be, for example, a resin, or a silicone, or an adhesive, etc. The cited material could have, for example, elastic or rigid characteristics, and be also capable to keep the two half-shells 2A, 2B mutually glued; for a better performance, the coupling means AL, DE could be also provided.

Like in the case of FIGS. 10–12, in the variant embodiment of FIGS. 13–19 there are provided a seal ring 31 on the shaft 3 and a perimetral seal, extending along the surface of junction between the half-shells 2A, 2B of casing 2. To this purpose, the half-shell bearing terminals 11, 12, i.e. half-shell 2B, has on the respective surface S a perimetral protrusion R, that is visible in for example in FIGS. 15–16, whose ends are in contact with gasket 31. The opposite half-shell, i.e. half-shell 2A, is instead provided with a corresponding seat or throat SR apt to receive the perimetral protrusion R.

Figure 14:
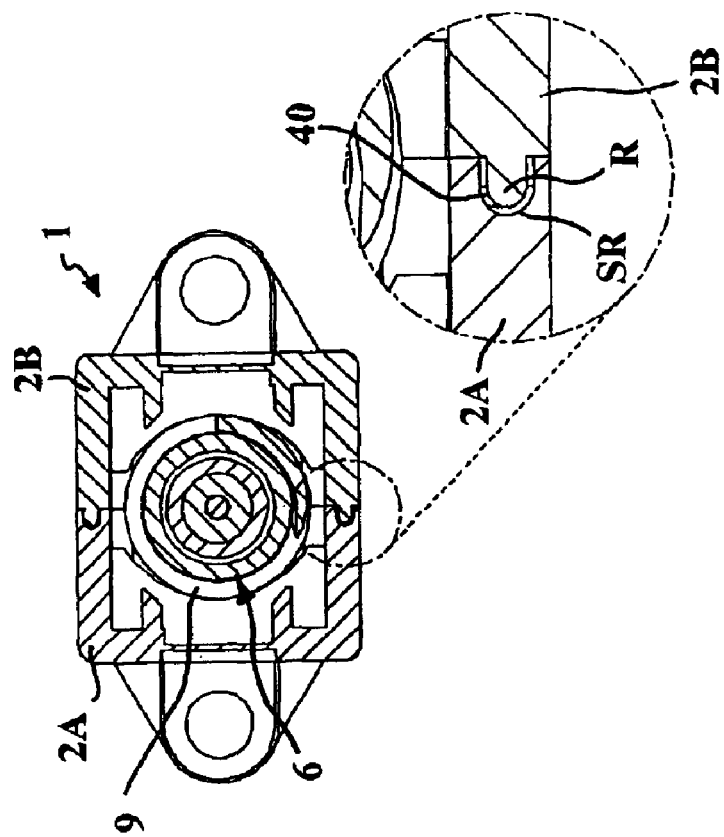
FIG. 14 is a section according to line XIV—XIV of FIG. 13.
Figure 13:
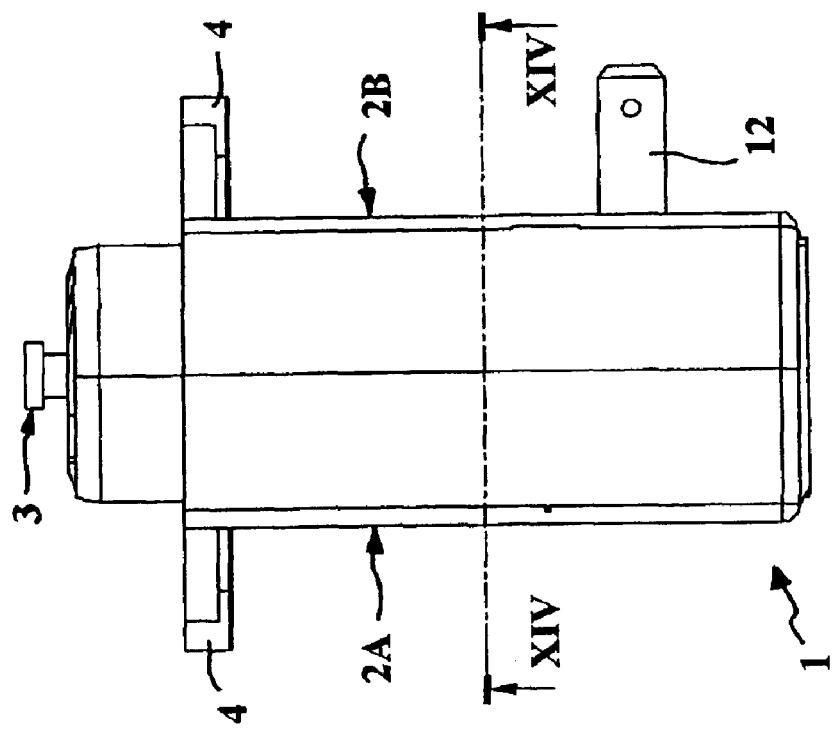
FIG. 13 is a first elevation view of a thermal actuator manufactured in accordance with a fourth embodiment of the invention.

The cavity of seat SR has preferably smaller dimensions than those of protrusion R; in the magnified part of FIG. 14 it can be noticed in particular the dimensional difference between said protrusion R and the respective seat SR, and how a space or gap is formed between them. Such a space is provided for receiving a material 40 capable of mutually sealing and/or sticking the external perimeter of half-shells 2A, 2B, and so realize a perimetral sealing jointly with the gasket 31; material 40 used for that purpose can be of any known type, such as an adhesive that remains elastic after the respective polymerization or hardening, and also the process of supplying and/or distributing said material can be of any known type.

As it emerges, therefore, also in this case a perimetral sealing is obtained by means of the gasket 31 operating on the shaft 3 and the sealing material 40 filling the cited space. The complete insulation from the environment of the device can be obtained by providing on terminals 11, 12 respective sealing elements like those previously indicated with 20 (FIGS. 8 and 9), or by providing the tubular portion 18 surrounding the external portions of terminals 11, 12 and the respective external protection member 19 (FIG. 6 or 10). Also in the embodiment of FIGS. 13–19 the half-shells 2A, 2B can be equipped with the half-walls 2A' and 2B', that realize a dividing wall separating the zone Z2 containing the electrical members from the zone Z1 containing the mechanical members of the thermal actuator 1.

Figure 15:
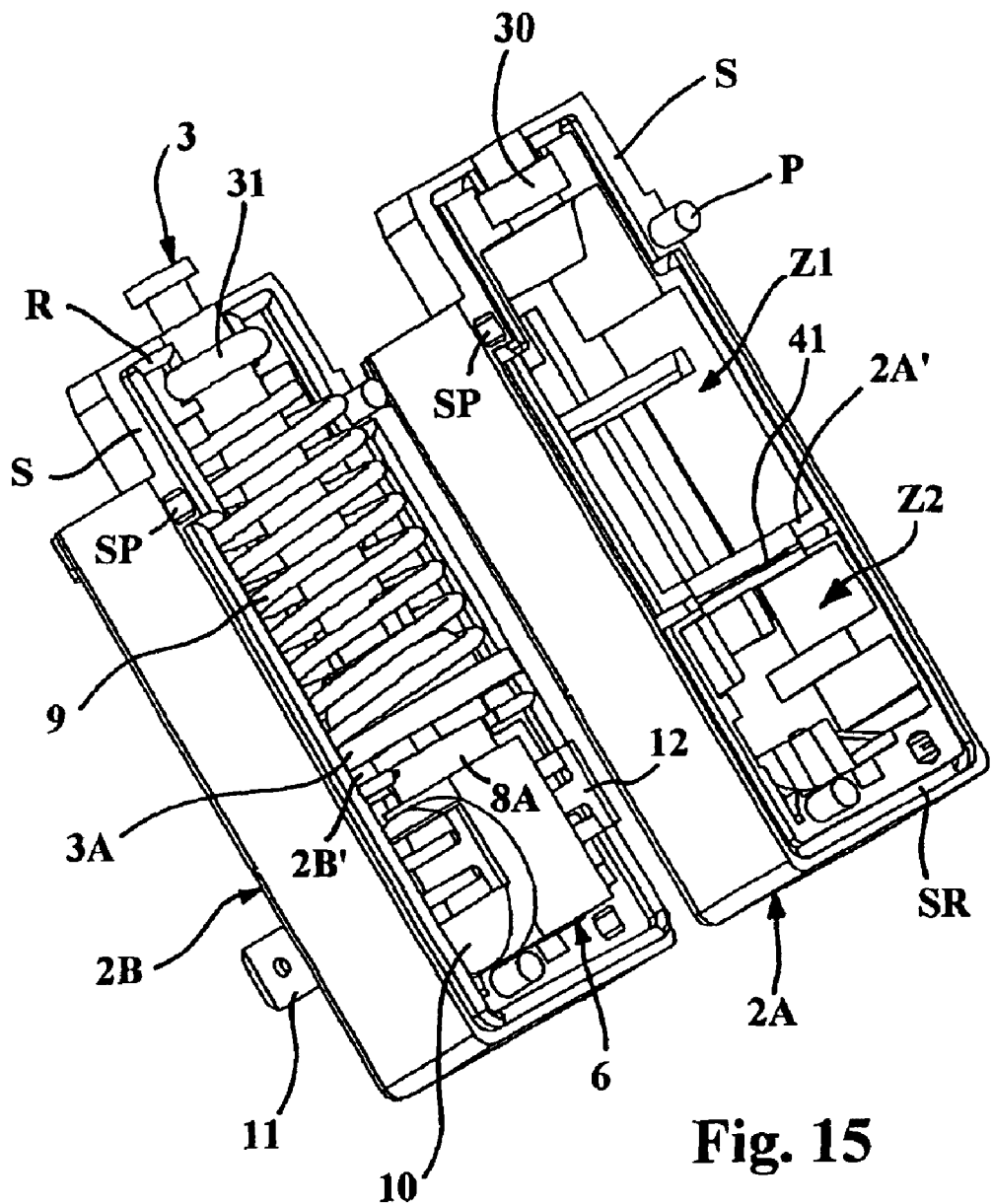
FIG. 15 is a perspective view of the thermal actuator of FIG. 13, with the respective casing being open.
Figure 16:
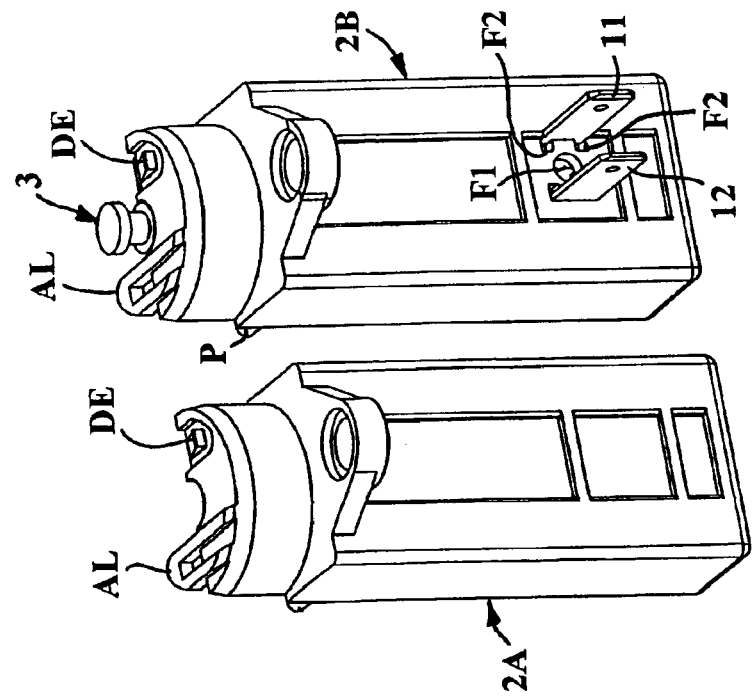
FIG. 16 is an exploded view of some components of the thermal actuator of FIG. 13.
Figure 17:
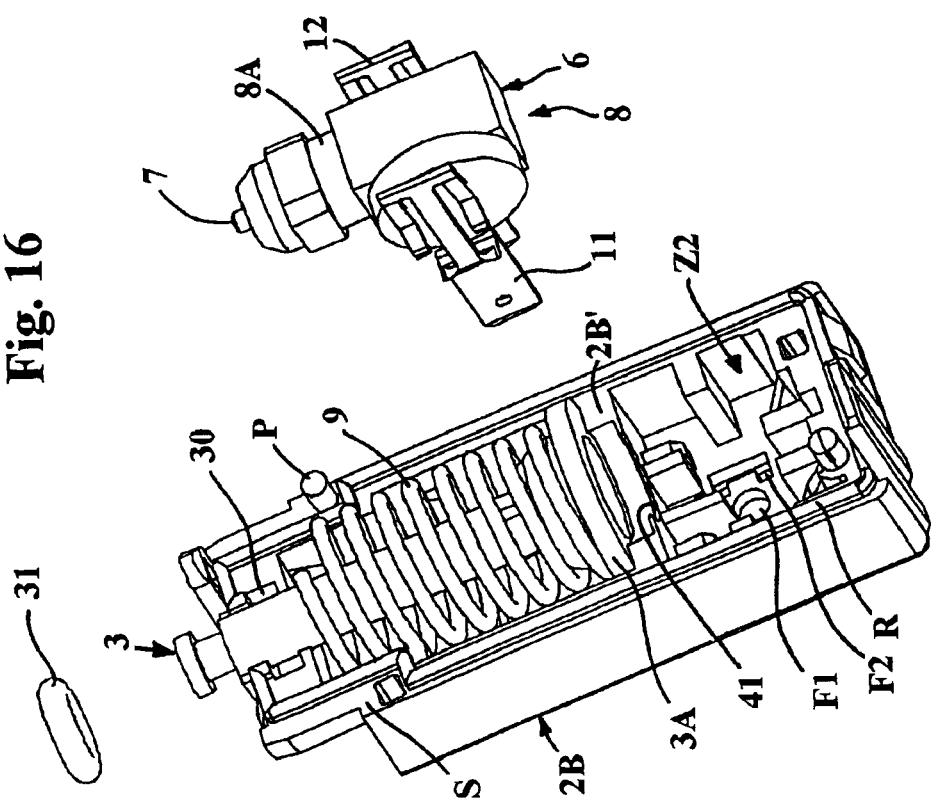
FIG. 17 is a perspective view of two parts constituting the casing of the thermal actuator of FIG. 13, according to a variant of the latter.
Figure 18:
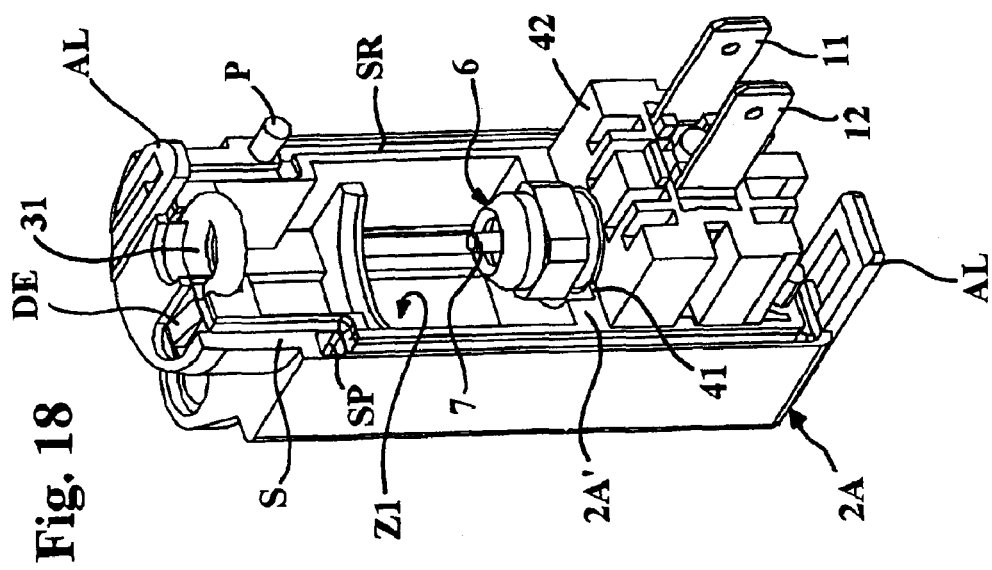
FIG. 18 is an exploded view of a part of FIG. 17.

In a possible variant embodiment such a dividing wall 2A'–2B' is preferably provided with a thinner wall portion, indicated with 41 in FIGS. 15, 16 and 18, in correspondence of the semicircular seats 16, which thinner wall portion is capable of performing a mechanical interference with body 8 of head 6; during assembly, said thin wall portions 41 can be easily deformed following interference with body 8 of head 6, so as to adapt its shape in a suitable way.

Figure 19:
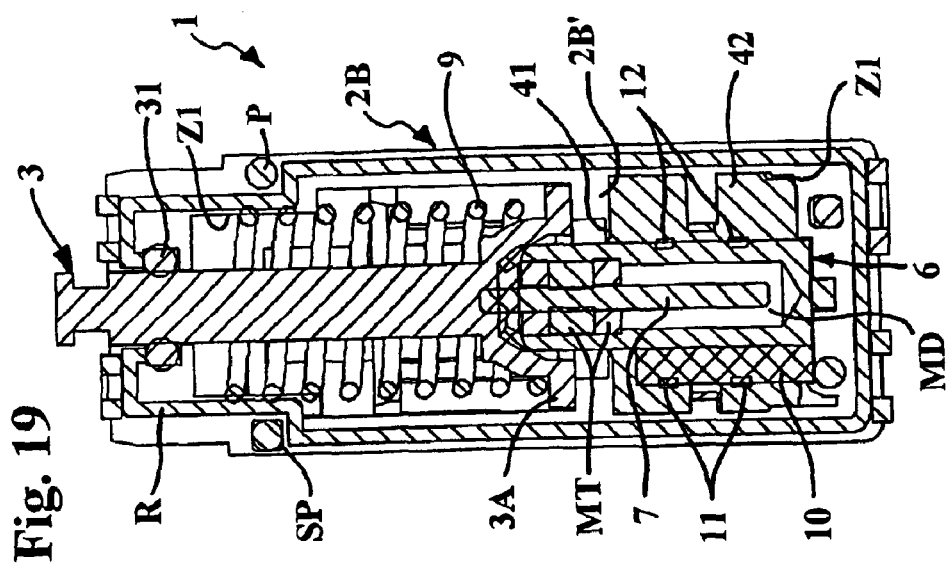
FIG. 19 is a section, being similar to the one of FIG. 4, of the thermal actuator according to the variant of FIGS. 18 and 19.

The cited interference between the thin semicircular portions 41 and the surface of body 8, preferably in an area in which the throat 8A is present, is therefore capable to realize a soft seal or separation between zones Z1 and Z2, namely for the time being necessary to perform a partial or total filling of zone Z2 with a suitable electrically insulating material, indicated with 42 in FIG. 19. Such a filling can be carried out, as an example, with a silicon material or a resin or other suitable material, once the two half-shells of casing 2 have been assembled, and after the other further particulars (head 6, heater 10, terminals 11, 12, spring 9, gasket 31) have been mounted.

For said purpose, unlike the previous embodiments, at least one of the two half-shells 2A, 2B is equipped with a hole or passage for the injection of the resin or other insulating material. As it is visible in FIG. 17, the resin can be injected in the zone Z2 through a hole F1 of half-shell 2B, present between the two terminals 11, 12; air being present in the same zone Z2 can escape, during injection of the material, through passages F2 that are part of the seats for the terminals 11, 12.

Following the injection, zone Z2 results in being filled up with a material 42, which forms a block that surrounds, and thus insulates and protects, the inner electrical members of the thermal actuator 1; such a block of insulating material 42 is visible for example in FIG. 18; the insulating material 42 is preferably of the type capable to harden, so realizing a solid and compact covering body.

It should be appreciated, for the case of injection of material 42, that the gasket 31 can eventually be omitted. It should also be noticed that in the variant embodiment of FIGS. 13–19, with or without inner resin injection, the perimetral sealing performed by the adhesive 40 of FIG. 14 could be limited only to the part of the contact surfaces S of half-shells 2A, 2B that surround zone Z2; for such a case, on the throat 8A of body 8 of head 6 the respective gasket 15 will be preferably provided.

FIGS. 20–23 represent a further possible embodiment of a thermal actuator according to the invention; also said figures use the reference numbers of the previous figures, in order to indicate elements being technically equivalent to those already described. The embodiment of FIGS. 20–23 is similar to that one described with reference to FIGS. 13–19, with the difference that in this case the perimetral protrusion R and the respective seat SR have substantially complementary shape and dimensions, or dimensions capable of determining a minimal interference, as it can be seen for example from FIG. 21; however, as an alternative, the device 1 could have surfaces S, or surfaces R, SR, being flat or having a shape different from the one represented as an example. This with the aim of realizing a sealing by means of a welding process, just in correspondence of the area of connection between the protrusion R and the seat SR, such as a vibration welding or ultrasound welding, or through thermal melting or other process suitable for hermetically joining and sealing the two half-shells 2A and 2B. Therefore, it should be noticed that, in this case, the half-shells do not have the means for mutual coupling constituted by pins P and respective cavities SP.

For the remainder, also with reference to the variant embodiment under discussion, the same considerations apply as for the embodiment of FIGS. 13–19; it should be noticed, for example, than also in this case the gasket 31 is provided on the shaft 3; rather than the gasket 31, the gasket 15 of FIGS. 5–6 6 could be provided, mounted in the throat 8A of body 8 of head 6, and cooperating with the semicircular seats 16 of the half-walls 2A' and 2B'.

In the case of FIGS. 20–23 insulation of zone Z2 of the thermal actuator 1 can be obtained through a perimetral gasket as previously described and completed by providing for terminals 11, 12 respective sealing elements of the type indicated above with 20 (FIGS. 8 and 9), or the half-shell 2B could be provided with the tubular portion 18 that surrounds the external portions of terminals 11, 12, with the respective external protection member 19 (FIG. 6 or 10).

Figure 23:
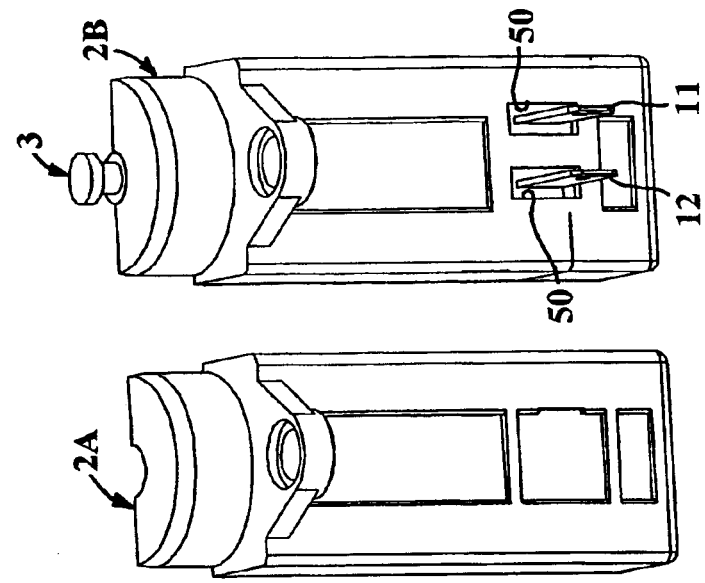
FIG. 23 is a perspective view of two parts constituting the casing of the thermal actuator of FIG. 20.
Figure 22:
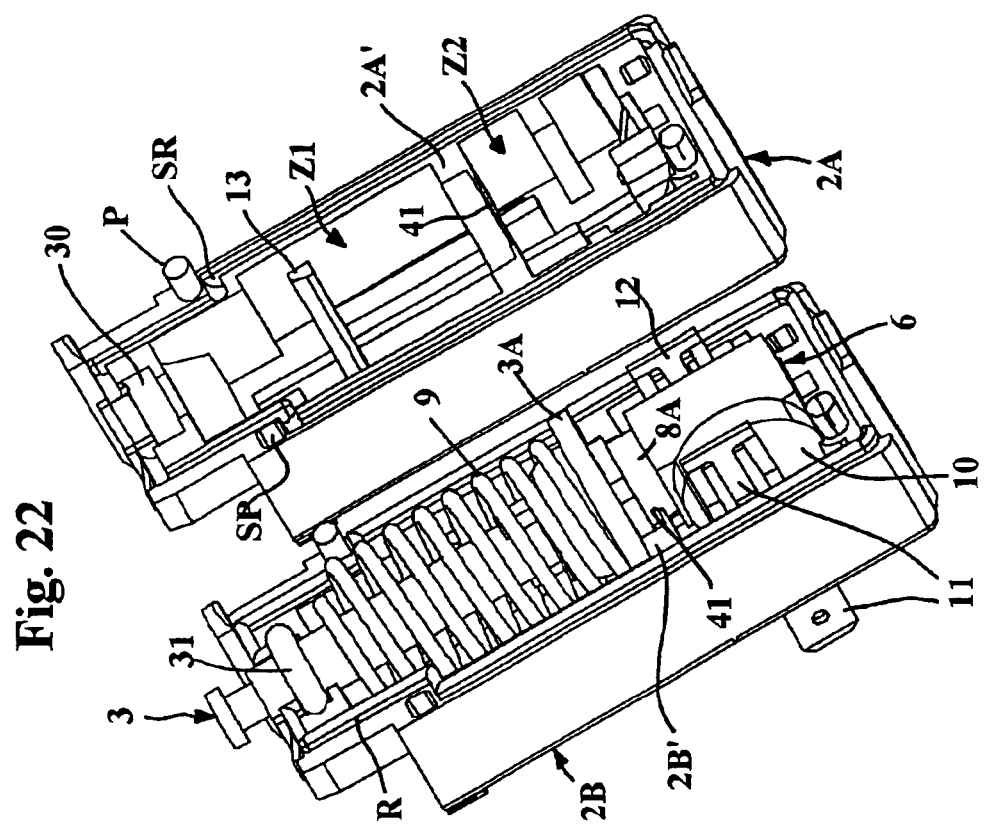
FIG. 22 is a perspective view of the thermal actuator of FIG. 20, with the respective casing being open.

A further possibility is that of distributing resin around the external portions of terminals 11 12; in order to favor such a process, in the half-shell 2B there are provided recesses or seats, indicated with 50 in FIG. 23, that surround an area of the external portion of terminals 11, 12 and are destined to contain the insulating material, such as a silicon material, resin, etc. It should be appreciated that said possibility of sealing the passage area of terminals 11, 12 is applicable also to the embodiments previously illustrated and described.

In the thermal actuator described the zone Z2 used for containing the electrical member results in being perfectly insulated and protected form the aggressive action of dangerous agents which can be present in the environment, such as water, water condensate, humidity, and so on. Moreover, as explained for some possible implementations of the invention, the sealing with respect to the outside can relate to the whole inner cavity of the casing 2, or only parts of it.

The principle of the invention remaining the same, the particular and materials of construction and the embodiments could be widely varied with respect to the description and the annexed drawings. Moreover, the single particulars previously described could be produced or obtained with any other known technique and could be partly omitted, or present in a different number and arrangement, in order to attain the aims of the present invention.

In the illustrated embodiments the heater 10 has an overall circular shape, but it is clear that such a shape could be different, for example a rectangular shape.

What is claimed is:

1. An electro-thermal actuator device (1) comprising
    a thermal actuator (6) having a body (8) containing a thermally expansible material (MD), a piston (7) partially inserted into said body (8) and seal means (MT) operating on at least one of said body (8) and said piston (7),
    an electric heater (10), capable of heating said body (8) in order to cause an increase in the volume of said expansible material (MD), and displacing said piston (7),
    a shaft (3) capable of sliding following displacement of said piston (7),
    electric terminals (11, 12) for supplying said heater (10), wherein
    said body (8) and said heater (10) are arranged in an inner cavity (Z1, Z2) of a casing (2) of the device (1),
    said shaft (3) has a first portion (3A) constantly arranged within said cavity (Z1, Z2) and a second portion capable of come out to the outside of said cavity (Z1, Z2) through a passage formed at an end of said casing (2),
    said terminals (11, 12) have each a first part positioned within said cavity (Z1, Z2) and a second part protruding out of said cavity (Z1, Z2),
    said casing (2) is formed by at least two half-shells or pieces (2A, 2B) mutually coupled or joined, an area of junction being present between said pieces (2A, 2B), which area is formed by two facing surfaces of junction (S), each surface pertaining to one of said pieces,
    characterized in that sealing means (15, G; 31, G1; 31, G2; 31; R, 40) are provided, operatively arranged between said surfaces of junction (S) and cooperating with a respective piece (2A, 2B) of the casing (2) in order to hermetically insulate at least a part (Z2) of said inner cavity (Z1, Z2) with respect to the external environment.

2. Device according to claim 1, characterized in that each surface of junction (S) lies at least in part on a plan that crosses in an axial way said body (8) or said shaft (3).

3. Device according to claim 1, characterized in that said shaft (3) protrudes out of said casing (2) through a passage partly defined in a first one (2B) of said two pieces and partly defined in a second one (2A) of said two pieces.

4. Device according to claim 1, characterized in that in the surface of junction (S) of at least a first one (2B) of said two pieces a first seat (16, SG; 30, SG; 30, SG2; 30; SR) is defined, for partially housing sealing means (15, G; 31, G1; 31, G2; 31, R, 40).

5. Device according to claim 4, characterized in that said first seat (SG; SG) extends along a limited part of the surface of junction (S) of the respective piece (2A, 2B) of the casing (2) and that said sealing means (15, G; 31, G1; 31, G2; 31; R, 40) comprise a first perimetral gasket (G; G1) partly housed in said first seat (SG; SG).

6. Device according to claim 5, characterized in that said sealing means (15, G; 31, G1; 31, G2; 31; R, 40) further comprise an annular gasket (15) cooperating with said body (8) and that said first perimetral gasket (G) comprises two ends (EG) in contact with said annular gasket (15, 31).

7. Device according to claim 4, characterized in that said first seat (SG2) extends along a prevailing part of the surface of junction (S) of the respective piece (2A, 2B) of the casing (2) and that said sealing means (15, G; 31, G1; 31, G2; 31; R, 40) comprise a perimetral gasket (G2) partly housed in said first seat (SG2).

8. Device according to claim 4, characterized in that said first seat (16, SG; 30, SG; 30, SG2; 30; SR) comprises a substantially semicircular housing (30) defined in an end wall of the respective piece (2A, 2B) of the casing (2).

9. Device according to claim 4, characterized in that said sealing means (15, G; 31, G1; 31, G2; 31, R, 40) comprise a protrusion (R) integral with one of said two pieces (2A, 2B) of the casing (2) and inserted in said first seat (SR), which is defined on the other one of said two pieces.

10. Device according to claim 9, characterized in that said protrusion (R) has smaller dimensions than said first seat (SR), between said protrusion (R) and said first seat (SR) a space being formed for containing a material (40) capable of reciprocally sealing and/or sticking said two pieces (2A, 2B) of the casing (2), said material (40) being part of said sealing means (15, G; 31, G1; 31, G2; 31, R, 40).

11. Device according to claim 1, characterized in that in the surface of junction of the second piece (2A, 2B) a second seat (16, SG; 30, SG; 30, SG2; 30; SR) is defined, for partially housing sealing means (15, G; 31, G1; 31, G2; 31, R, 40).

12. Device according to claim 11, characterized in that said sealing means (15, G; 31, G1; 31, G2; 31, R, 40) comprise an annular gasket (15, 31) partly housed within said first seat and partly housed within said second seat.

13. Device according to claim 11, characterized in that said first seat (16, SG; 30, SG; 30, SG2; 30; SR) comprises at least a first substantially semicircular housing (16) being defined in the surface of junction (S) of one of said two pieces (2A, 2B) of the casing (2) and that said second seat (16, SG; 30, SG; 30, SG2; 30; SR) comprises at least a substantially semicircular housing (16) being defined in the surface of junction of the other of said two pieces (2A, 2B).

14. Device according to claim 11, characterized in that said cavity (Z1, Z2) is transversally subdivided into a first and a second zone (Z1, Z2) by means of an intermediate wall (2A', 2B') formed by the union of two half-walls (2A', 2B'), each half-wall (2A', 2B') being an integral part of a respective piece (2A, 2B) of said casing (2), that said first seat (16, SG; 30, SG; 30, SG2; 30; SR) comprises at least a first substantially semicircular housing (16) being defined in the half-wall (2A', 2B') of one of said two pieces (2A, 2B) of the casing (2) and that said second seat (16, SG; 30, SG; 30, SG2; 30; SR) comprises at least a substantially semicircular housing (16) being defined in the half-wall (2A', 2B') of the other piece (2A, 2B).

15. Device according to claim 11, characterized in that said second seat (SG; SG) extends along a limited part of the surface of junction (S) of the respective piece (2A, 2B) of the casing (2) and that said sealing means (15, G; 31, G1; 31, G2; 31; R, 40) comprise a perimetral gasket (G; SG) partly housed in said second seat (SG; SG).

16. Device according to claim 11, characterized in that said second seat (SG2) extends along a prevailing part of the surface of junction (S) of the respective piece (2A, 2B) of the casing (2) and that said sealing means (15, G; 31, G1; 31, G2; 31; R, 40) comprise a perimetral gasket (G2) partly housed in said second seat (SG2).

17. Device according to claim 11, characterized in that said second seat (16, SG; 30, SG; 30, SG2; 30; SR) comprises a substantially semicircular housing (30) defined in an end wall of the respective piece (2A, 2B) of the casing (2).

18. Device according to claim 17, characterized in that said sealing means (15, G; 31, G1; 31, G2; 31; R, 40) comprise at least one annular gasket (31) operating a seal on said shaft (3) and positioned in correspondence of said semicircular housings (30).

19. Device according to claim 1, characterized in that said sealing means (15, G; 31, G1; 31, G2; 31, R, 40) comprise an annular gasket (15, 31).

20. Device according to claim 19, characterized in that said annular gasket (31) operates a seal on said shaft (3) and that the latter, at least in the area cooperating with said annular gasket (31), is free from longitudinal burrs or lines of junction.

21. Device according to claim 1, characterized in that said casing (2) comprises at least one seat (16, 30), partially obtained in a first one (2B) of said two pieces and partially obtained in a second one (2A) of said two pieces, apt at housing sealing means of annular shape (15, 31).

22. Device according to claim 1, characterized in that in an area of said body (8) of the thermal actuator (6) a housing is defined (8A).

23. Device according to claim 22, characterized in that said housing (8A) has a circular development or shape.

24. Device according to claim 22, characterized in that said housing (8A) is located in an area of said body (8) close to a zone from which said piston (7) protrudes out of said body.

25. Device according to claim 22, characterized in that said housing (8A) has a shape of throat having a circular development.

26. Device according to claim 22, characterized in that said body (8), in correspondence of said housing (8A), has a circular section.

27. Device according to claim 22, characterized in that said housing (8A) is located close to a part of said body (8) having a quadrangular section or close to a part of said body (8) having flat faces.

28. Device according to claim 22, characterized in that said housing (8A) is located close to said heater (10).

29. Device according to claim 22, characterized in that said sealing means (15) are located close to said heater (10).

30. Device according to claim 22, characterized in that said sealing means comprise an annular gasket (15) mounted on or within said housing (8A).

31. Device according to claim 1, characterized in that said cavity (Z1, Z2) is transversally subdivided into a first and a second zone (Z1, Z2) by means of an intermediate wall (2A', 2B'), in the first zone (Z1) being positioned said first portion (3A) of said shaft (3) and in the second zone (Z2) being positioned said heater (10), said first part of said terminals (11, 12) and at least a portion of said thermal actuator (6).

32. Device according to claim 31, characterized in that within said second zone (Z2) an electrically insulating material (42) is present, and that at least one of said pieces (2A, 2B) the casing (2) has a hole or passage (F1) for the injection of said electrically insulating material (42).

33. Device according to claim 32, characterized in that at least one of said pieces of the casing (2) has a hole or passage (F2) for air escape during the injection of said electrically insulating material (42).

34. Device according to claim 32, characterized in that said electrically insulating material (42) is capable of hardening and/or realizing a rigid body within the casing (2) after its injection, in particular a silicon material or a resin.

35. Device according to claim 31, characterized in that separation means (15, 2A', 2B', 41) are provided, acting for preventing infiltration of electrically insulating material (42) towards said first zone (Z1) of the cavity (Z1, Z2), in particular during an injection operation of the same material in said second zone (Z2) of said cavity.

36. Device according to claim 35, characterized in that said separation means (15, 2A', 2B', 41) comprise at least one gasket.

37. Device according to claim 35, characterized in that said separation means (15, 2A', 2B', 41) comprise said intermediate wall (2A', 2B').

38. Device according to claim 35, characterized in that said separation means (15, 2A', 2B', 41) comprise two half-walls (2A', 2B'), each half-wall being an integral part of a respective piece (2A, 2B) of said casing (2), said intermediate wall being formed by the union of said half-walls (2A', 2B').

39. Device according to claim 3, characterized in that said first portion of the shaft (3A) has a concavity capable of housing a front area of said body (8) which protrudes into said first zone (Z1).

40. Device according to claim 31, characterized in that said intermediate wall is formed by the union of two half-walls (2A', 2B'), each half-wall (2A', 2B') being an integral part of a respective piece (2A, 2B) of said casing (2).

41. Device according to claim 1, characterized in that said sealing means (15, G; 31, G1; 31, G2; 31; R, 40) comprise a sealing element (G; G1; G2; R, 40) which is arranged substantially parallel to the surfaces of junction (S) of said two pieces (2A, 2B) of the casing (2).

42. Device according to claim 1, characterized in that said sealing means (15, G; 31, G1; 31, G2; 31; R, 40) comprise at least one first perimetral gasket (G1) having a half-ring shaped portion (15A) and a perimetral sealing portion (G1').

43. Device according to claim 42, characterized in that said sealing means (15, G; 31, G1; 31, G2; 31; R, 40) comprise at least a second perimetral gasket (G1) having a half-ring shaped portion (15A) and a perimetral sealing portion (G1'), the first and second perimetral gasket (G1) being substantially specular and mating.

44. Device according to claim 1, characterized in that said sealing means (15, G; 31, G1; 31, G2; 31, R, 40) are obtained at least in part through a welding process of the surfaces of junction (S), or the pieces (2A, 2B) are made integral to each other through a melting and solidification process of material constituting the two pieces (2A, 2B).

45. Device according to claim 44, characterized in that said two pieces (2A, 2B) are reciprocally welded or made integral to each other through thermal melting or ultrasound welding.

46. Device according to claim 44, characterized in that said surface of junction (S) comprises at least a protrusion (R) integral with one of said two pieces (2A, 2B) of the casing (2) and inserted in said first seat (SR), that it is defined on the other one of said two pieces.

47. Device according to claim 46, characterized in that said protrusion (R) and said first seat (SR) have substantially complementary shape and dimensions, or such to determine a minimal interference, and that in correspondence of the area of coupling between said protrusion (R) and said first seat (SR) said two pieces of the casing are mutually welded.

48. Device according to claim 1, characterized in that additional sealing means are provided, for preventing infiltrations towards the inside of said cavity (Z1, Z2) along said terminals (11, 12).

49. Device according to claim 48, characterized in that said additional sealing means comprise an insulating material arranged outside said casing (2) and around a part of said second portion of the terminals (11, 12).

50. Device according to claim 49, characterized in that in the piece of the casing (2) from which said second portion of the terminals (11, 12) protrudes out, there are provided one or more seats (50) for containing said insulating material (50).

51. Device according to claim 48, characterized in that said additional sealing means comprise a projection or a tubular portion (18) of the piece of the casing (2) from which said second portion of the terminals (11, 12) protrudes out, the latter lying at least partly within said tubular portion (18).

52. Device according to claim 51, characterized in that said additional sealing means comprise an external sealing member (19), which is internally hollow, at least partly elastic and partially mounted on said tubular portion (18).

53. Device according to claim 52, characterized in that said external sealing member (19) is operative for performing a seal on an electric cable for supplying said heater (10).

54. Device according to claim 48, characterized in that said additional sealing means comprise at least an elastic sealing element (20) having a respective slit in which a part of a terminal (11, 12) passes through, the elastic sealing element (20) carrying out a seal between said terminal (11, 12) and the piece of the casing (2) from which said second portion of said terminals (11, 12) protrudes.

55. Device according to claim 1, characterized in that said heater (10) is a positive temperature coefficient resistor having circular or rectangular shape.

56. An electro-thermal actuator device (1) comprising
a thermal actuator (6) having a body (8) containing a thermally expansible material (MD), a piston (7) partially inserted into said body (8) and seal means (MT) operating on at least one of said body (8) and said piston (7),
an electric heater (10), capable of heating said body (8) in order to cause an increase in the volume of said expansible material (MD), and displacing said piston (7),
a shaft (3) capable of sliding following displacement of said piston (7),
electric terminals (11, 12) for supplying said heater (10), wherein
said body (8) and said heater (10) are arranged in an inner cavity (Z1, Z2) of a casing (2) of the device (1),
said shaft (3) has a first portion (3A) constantly arranged within said cavity (Z1, Z2) and a second portion capable of come out to the outside of said cavity (Z1, Z2) through a passage formed at an end of said casing (2),
said terminals (11, 12) have each a first part positioned within said cavity (Z1, Z2) and a second part protruding out of said cavity (Z1, Z2),
said casing (2) is formed by at least two half-shells or pieces (2A, 2B) mutually coupled or joined, an area of junction being present between said pieces (2A, 2B), which area is formed by two facing surfaces of junction (S), each surface pertaining to one of said pieces,
characterized in that at least a seat is defined (16, 30) in said casing (2), partially obtained in a first one (2B) of said two pieces and partially obtained in a second one (2A) of said two pieces, said seat (16, 30) being capable of cooperating with annular shaped sealing means (15, 31).

57. Device according to claim 56, characterized in that said annular sealing means (15, 31) perform a seal which is at least partly radial on at least one between said body (8) and said shaft (3).

58. An electro-thermal actuator device (1) comprising
a thermal actuator (6) having a body (8) containing a thermally expansible material (MD), a piston (7) partially inserted into said body (8) and seal means (MT) operating on at least one of said body (8) and said piston (7),
an electric heater (10), capable of heating said body (8) in order to cause an increase in the volume of said expansible material (MD), and displacing said piston (7), a shaft (3) capable of sliding following displacement of said piston (7), electric terminals (11, 12) for supplying said heater (10), wherein said body (8) and said heater (10) are arranged in an inner cavity (Z1, Z2) of a casing (2) of the device (1), said shaft (3) has a first portion (3A) constantly arranged within said cavity (Z1, Z2) and a second portion capable of come out to the outside of said cavity (Z1, Z2) through a passage formed at an end of said casing (2), said terminals (11, 12) have each a first part positioned within said cavity (Z1, Z2) and a second part protruding out of said cavity (Z1, Z2), said casing (2) is formed by at least two half-shells or pieces (2A, 2B) mutually coupled or joined, an area of junction being present between said pieces (2A, 2B), which area is formed by two facing surfaces of junction (S), each surface pertaining to one of said pieces, characterized in that sealing means (15, G; 31, G1; 31, G2; 31; R, 40) are provided, for hermetically insulating at least a part (Z2) of said inner cavity (Z1, Z2), comprising at least an annular gasket (15, 31), which is partly housed in a first seat obtained in a first one (2B) of said two pieces, and partly housed in a second seat, obtained in a second one (2A) of said two pieces.

59. An electro-thermal actuator device (1) comprising
a thermal actuator (6) having a body (8) containing a thermally expansible material (MD), a piston (7) partially inserted into said body (8) and seal means (MT) operating on at least one of said body (8) and said piston (7), an electric heater (10), capable of heating said body (8) in order to cause an increase in the volume of said expansible material (MD), and displacing said piston (7), a shaft (3) capable of sliding following displacement of said piston (7), electric terminals (11, 12) for supplying said heater (10), wherein said body (8) and said heater (10) are arranged in an inner cavity (Z1, Z2) of a casing (2) of the device (1), said shaft (3) has a first portion (3A) constantly arranged within said cavity (Z1, Z2) and a second portion capable of come out to the outside of said cavity (Z1, Z2) through a passage formed at an end of said casing (2), said terminals (11, 12) have each a first part positioned within said cavity (Z1, Z2) and a second part protruding out of said cavity (Z1, Z2), said casing (2) is formed by at least two half-shells or pieces (2A, 2B) mutually coupled or joined, an area of junction being present between said pieces (2A, 2B), which area is formed by two facing surfaces of junction (S), each surface pertaining to one of said pieces, characterized in that only within said second zone (Z2) an electrically insulating material (42) is present, which is injected into said cavity (Z1, Z2) after the coupling or junction of said two pieces (2A, 2B), and that there are provided sealing or separation means (15, 2A', 2B', 41) for preventing infiltrations of said electrically insulating material (42) towards said first zone (Z1).

60. An electro-thermal actuator device (1) comprising
a thermal actuator (6) having a body (8) containing a thermally expansible material (MD), a piston (7) partially inserted into said body (8) and seal means (MT) operating on at least one of said body (8) and said piston (7), an electric heater (10), capable of heating said body (8) in order to cause an increase in the volume of said expansible material (MD), and displacing said piston (7), a shaft (3) capable of sliding following displacement of said piston (7), electric terminals (11, 12) for supplying said heater (10), wherein said body (8) and said heater (10) are arranged in an inner cavity (Z1, Z2) of a casing (2) of the device (1), said shaft (3) has a first portion (3A) constantly arranged within said cavity (Z1, Z2) and a second portion capable of come out to the outside of said cavity (Z1, Z2) through a passage formed at an end of said casing (2), said terminals (11, 12) have each a first part positioned within said cavity (Z1, Z2) and a second part protruding out of said cavity (Z1, Z2), said casing (2) is formed by at least two half-shells or pieces (2A, 2B) mutually coupled or joined, an area of junction being present between said pieces (2A, 2B), which area is formed by two facing surfaces of junction (S), each surface pertaining to one of said pieces, characterized in that said two pieces (2A, 2B) are welded or made integral to each other for sealing purposes by means of a process of melting and solidification of material constituting the two pieces (2A, 2B).

61. Device according to claim 60, characterized in that said two pieces (2A, 2B) are welded or made integral by means of thermal melting or ultrasound welding.

62. An electro-thermal actuator device (1) comprising
a thermal actuator (6) having a body (8) containing a thermally expansible material (MD), a piston (7) partially inserted into said body (8) and seal means (MT) operating on at least one of said body (8) and said piston (7), an electric heater (10), capable of heating said body (8) in order to cause an increase in the volume of said expansible material (MD), and displacing said piston (7), a shaft (3) capable of sliding following displacement of said piston (7), electric terminals (11, 12) for supplying said heater (10), wherein said body (8) and said heater (10) are arranged in an inner cavity (Z1, Z2) of a casing (2) of the device (1), said shaft (3) has a first portion (3A) constantly arranged within said cavity (Z1, Z2) and a second portion capable of come out to the outside of said cavity (Z1, Z2) through a passage formed at an end of said casing (2), said terminals (11, 12) have each a first part positioned within said cavity (Z1, Z2) and a second part protruding out of said cavity (Z1, Z2), said casing (2) is formed by at least two half-shells or pieces (2A, 2B) mutually coupled or joined, an area of junction being present between said pieces (2A, 2B), which area is formed by two facing surfaces of junction (S), each surface pertaining to one of said pieces, characterized in that a housing (8A) is defined on said body (8) for positioning respective sealing means (15;

15'), said sealing means (15; 15') cooperating for sealing purposes between said body (8) and a respective piece (2A, 2B) of the casing (2).

63. An electro-thermal actuator device (1) comprising
a thermal actuator (6) having a body (8) containing a thermally expansible material (MD), a piston (7) partially inserted into said body (8) and seal means (MT) operating on at least one of said body (8) and said piston (7),
an electric heater (10), capable of heating said body (8) in order to cause an increase in the volume of said expansible material (MD), and displacing said piston (7),
a shaft (3) capable of sliding following displacement of said piston (7),
electric terminals (11, 12) for supplying said heater (10), wherein
said body (8) and said heater (10) are arranged in an inner cavity (Z1, Z2) of a casing (2) of the device (1),
said shaft (3) has a first portion (3A) constantly arranged within said cavity (Z1, Z2) and a second portion capable of come out to the outside of said cavity (Z1, Z2) through a passage formed at an end of said casing (2),
said terminals (11, 12) have each a first part positioned within said cavity (Z1, Z2) and a second part protruding out of said cavity (Z1, Z2),
said casing (2) is formed by at least two half-shells or pieces (2A, 2B) mutually coupled or joined, an area of junction being present between said pieces (2A, 2B), which area is formed by two facing surfaces of junction (S), each surface pertaining to one of said pieces,
characterized in that in the surface of junction (S) of at least a first one (2B) of said two pieces a first seat (16, SG; 30, SG; 30, SG2; 30; SR) is defined, for partially housing sealing means (15, G; 31, G1; 31, G2; 31, R, 40).

64. Device according to claim 63, characterized in that in the surface of junction (S) of the second piece (2A, 2B) a second seat (16, SG; 30, SG; 30, SG2; 30; SR) is defined for partially housing said sealing means (15, G; 31, G1; 31, G2; 31, R, 40).

65. An electro-thermal actuator device (1) comprising
a thermal actuator (6) having a body (8) containing a thermally expansible material (MD), a piston (7) partially inserted into said body (8) and seal means (MT) operating on at least one of said body (8) and said piston (7),
an electric heater (10), capable of heating said body (8) in order to cause an increase in the volume of said expansible material (MD), and displacing said piston (7),
a shaft (3) capable of sliding following displacement of said piston (7),
electric terminals (11, 12) for supplying said heater (10), wherein
said body (8) and said heater (10) are arranged in an inner cavity (Z1, Z2) of a casing (2) of the device (1),
said shaft (3) has a first portion (3A) constantly arranged within said cavity (Z1, Z2) and a second portion capable of come out to the outside of said cavity (Z1, Z2) through a passage formed at an end of said casing (2),
said terminals (11, 12) have each a first part positioned within said cavity (Z1, Z2) and a second part protruding out of said cavity (Z1, Z2),
said casing (2) is formed by at least two half-shells or pieces (2A, 2B) mutually coupled or joined, an area of junction being present between said pieces (2A, 2B), which area is formed by two facing surfaces of junction (S), each surface pertaining to one of said pieces,
an annular gasket (15, 31) is provided, which cooperates, on the one side, with at least one between said body (8) and said shaft (3) and, on the other side, with at least one of said pieces (2A, 2B) in order to hermetically insulate at least a part (Z2) of said inner cavity (Z1, Z2) with respect to the external environment,
said surfaces of junction (S) are mutually welded or made integral to each other through a process of melting and solidification of material constituting said two pieces (2A, 2B).

66. An electro-thermal actuator device (1) comprising
a thermal actuator (6) having a body (8) containing a thermally expansible material (MD), a piston (7) partially inserted into said body (8) and seal means (MT) operating on at least one of said body (8) and said piston (7),
an electric heater (10), capable of heating said body (8) in order to cause an increase of volume of said expansible material (MD), and displacing said piston (7),
a shaft (3) capable of moving following displacement of said piston (7),
electric terminals (11, 12) for supplying said heater (10), wherein
said body (8) and said heater (10) are arranged in an inner cavity (Z1, Z2) of a casing (2) of the device (1),
said shaft (3) has a first portion (3A) constantly arranged within said cavity (Z1, Z2) and a second portion capable of come out to the outside of said cavity (Z1, Z2) through a passage formed at an end of said casing (2),
wherein a body portion (18) of said casing (2) and a contact portion of said terminals (11, 12) are arranged to form an electrical connector having at least two poles.

67. Device according to claim 66, wherein said body portion (18) surrounds at least partially said contact portion of said terminals (11, 12).

68. Device according to claim 66, wherein said body portion (18) is defined by a part of said casing (2).

69. Device according to claim 68, wherein said body portion (18) comprises a projecting tubular portion of said casing (2).

70. Device according to claim 66, wherein said terminals (11, 12) have each a first part positioned within said cavity (Z1, Z2) and a second part protruding out of said cavity (Z1, Z2), said contact portion being formed in said second part.

71. Device according to claim 66, wherein said electrical connector having at least two poles is a Rast type connector.

72. Device according to claim 66, wherein said casing (2) is formed by at least two mutually coupled pieces (2A, 2B).

* * * * *

UNITED STATES PATENT AND TRADEMARK OFFICE
CERTIFICATE OF CORRECTION

PATENT NO. : 6,916,086 B2
DATED : July 12, 2005
INVENTOR(S) : Costanzo Gadini, Renato Gaj and Marco Moro It is certified that error appears in the above-identified patent and that said Letters Patent is hereby corrected as shown below:

<u>Title page,</u>
Item [30], Foreign Application Priority Data, should read -- Aug. 7, 2002 --.

Signed and Sealed this

Fourth Day of April, 2006

JON W. DUDAS
*Director of the United States Patent and Trademark Office*